(12) United States Patent
Kotani (10) Patent No.: US 8,585,214 B2
(45) Date of Patent: Nov. 19, 2013

(54) VIDEO PROJECTOR

(75) Inventor: Kazunori Kotani, Nara (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 94 days.

(21) Appl. No.: 13/220,637

(22) Filed: Aug. 29, 2011

(65) Prior Publication Data

US 2012/0050624 A1    Mar. 1, 2012

(30) Foreign Application Priority Data

Aug. 31, 2010   (JP) ................................. 2010-193651

(51) Int. Cl.
*G03B 21/20* (2006.01)

(52) U.S. Cl.
USPC ................. 353/85; 353/87; 353/94; 353/119; 353/122; 362/85; 362/346

(58) Field of Classification Search
USPC ............ 353/30, 85, 87, 94, 119, 122; 362/85, 362/133, 137, 155, 241, 247, 297, 341, 362/346; 349/5, 7–9
See application file for complete search history.

(56) References Cited

U.S. PATENT DOCUMENTS

| | | | |
|---|---|---|---|
| 5,649,753 A | 7/1997 | Masumoto | |
| 7,290,885 B2 * | 11/2007 | Salvatori et al. | 353/36 |
| 7,628,510 B2 * | 12/2009 | Chen et al. | 362/241 |
| 7,824,038 B2 * | 11/2010 | Yun et al. | 353/58 |
| 2001/0053078 A1 | 12/2001 | Ishikawa et al. | |
| 2010/0117539 A1 | 5/2010 | Kotani et al. | |

FOREIGN PATENT DOCUMENTS

| | | |
|---|---|---|
| EP | 0 683 425 A1 | 11/1995 |
| EP | 2 184 640 A2 | 5/2010 |
| JP | 2009-31715 A | 2/2009 |
| JP | 2009-192711 A | 8/2009 |

OTHER PUBLICATIONS

Extended European Search Report dated Jun. 19, 2013 for corresponding application No. EP 11 17 8983.

* cited by examiner

*Primary Examiner* — Georgia Y Epps
*Assistant Examiner* — Sultan Chowdhury
(74) *Attorney, Agent, or Firm* — NDQ&M Watchstone LLP (57) ABSTRACT

A video projector including a plurality of light sources is configured to project and display an image using light emitted from at least one of the light sources so that each light source is replaceable while other light sources are lit. The video projector includes a light source replacement detection unit that detects replacement of one or more light sources, a memory unit that stores information related to a combined lighting state of the light sources, and a control unit that changes the combined lighting state of the light sources when the replacement of at least one light source is detected without displaying, on the projected image, a setting screen used to change the combined lighting state.

15 Claims, 6 Drawing Sheets

Fig.2

| Stored Item | Stored Content |
|---|---|
| Lighting Mode After Lamp Replacement | 4-Lamp Mode |
| Closed State Determination Reference Time After Lamp Cover Closure | 1 Minute |

VIDEO PROJECTOR

CROSS-REFERENCE TO RELATED APPLICATIONS

This application is based upon and claims the benefit of priority from prior Japanese Patent Application No. 2010-193651, filed on Aug. 31, 2010, the entire contents of which are incorporated herein by reference.

BACKGROUND OF THE INVENTION

The present invention relates to a video projector including a plurality of light sources.

Japanese Laid-Open Patent Publication No. 2009-31715 discloses a video projector including a plurality of light sources. The video projector combines the light emitted from the light sources. In such a structure that combines the light emitted from the light sources, for example, when one of four light sources cannot be lit, an image can still be entirely displayed using the remaining three light sources.

A projector such as a video projector generally includes an on-screen display (OSD) function used to set various items (refer to Japanese Laid-Open Patent Publication No. 2009-192711). The OSD is an image presented to the user to set various items, and the OSD function of the video projector is used to project and display such an OSD as an image.

In the video projector described in Japanese Laid-Open Patent Publication No. 2009-192711, when the life of a light source comes to an end and the light source can no longer be lit, the light source can be replaced with a new one.

In a video projector including a plurality of light sources, for example, when one of four light sources cannot be lit, an image can still be continuously displayed using three light sources by changing the lighting state of the light sources, that is, the number of light sources that are lit. By replacing the light source that cannot be lit with a new light source while the other light sources are lit, the number of light sources that are lit to display an image can be changed from three to four.

However, after replacing a light source, when changing the number of light sources from, for example, three to four, an image is presented to the user to set the lighting state of the light sources, that is, an OSD is displayed as an image used to select the combination of the lighting sources that are lit. In such a case, at least part of an image cannot be displayed.

SUMMARY OF THE INVENTION

One aspect of the present invention is a video projector including a plurality of light sources. The video projector is configured to project and display an image using light emitted from at least one of the light sources so that each light source is replaceable while other light sources are lit. A light source replacement detection unit detects replacement of one or more of the light sources. A memory unit that stores information related to a combined lighting state of the light sources. A control unit changes the combined lighting state of the light sources when the replacement of at least one light source is detected without displaying, on the projected image, a setting screen used to change the combined lighting state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

Figure 2:
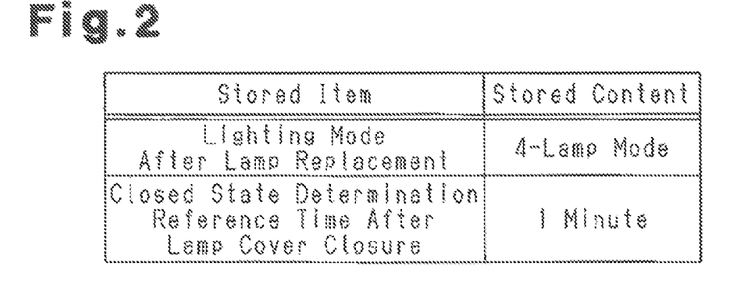
FIG. 2 is a table showing an example of items stored in a memory unit and the contents of the items in the video projector of FIG. 1.
Figure 3:
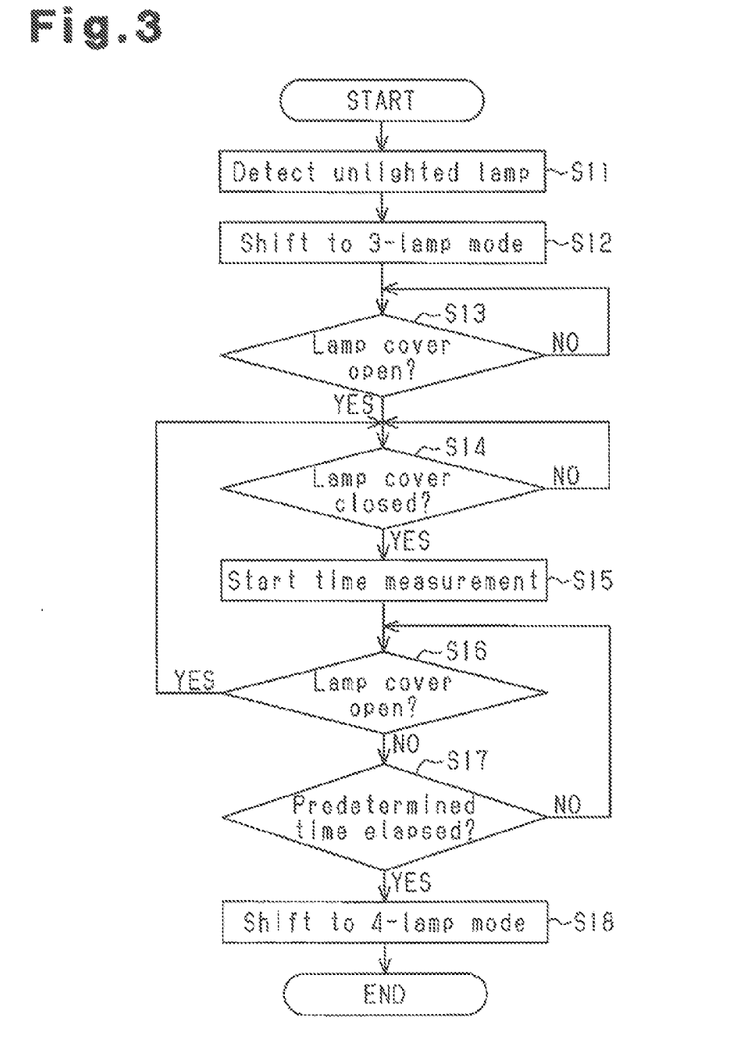
FIG. 3 is a flowchart showing the flow of operations in the video projector of FIG. 1.

A first embodiment of a video projector will now be described with reference to FIGS. 1 to 3.

Figure 1:
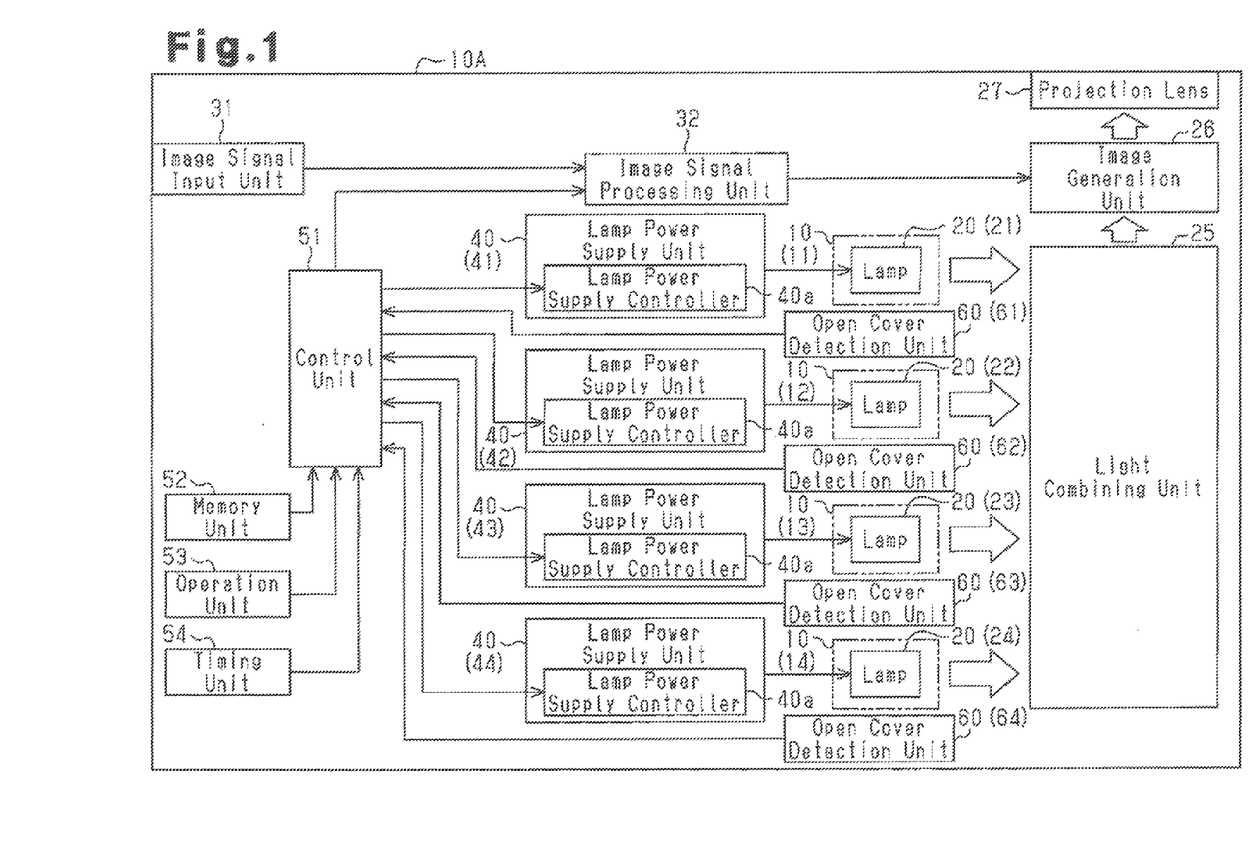
FIG. 1 is a schematic diagram showing a first embodiment of a video projector.

As shown in FIG. 1, a projector 1, which is a video projector, includes a plurality of lamps 20, which serves as light sources used to display images. The projector 1 projects and displays an image onto a flat surface such as a screen or a wall using the light emitted from at least one of the lamps 20.

The lamps 20 of the projector 1 include a first lamp 21, a second lamp 22, a third lamp 23, and a fourth lamp 24. In other words, the projector 1 is a four-lamp type video projector.

One or more of the lamps 20 can be replaced with new ones when the other lamps 20 are lit. For instance, the lamp 21 is replaceable when the lamps 22 to 24 are lit. Thus, even when the life of one lamp 20 ends, an entire image can still be continuously displayed using three lamps 20.

The projector 1 includes a housing 10A that accommodates optical components such as the lamps 20. The housing 10A includes a lamp cover 10 (light source cover) that open and close an internal area of the housing 10A, in which the lamps 20 are arranged. When the life of a lamp 20 in the housing 10A comes to its end and the lamp 20 can no longer be lit, the lamp 20 can be replaced with a new lamp 20 by opening the lamp cover 10.

In the present embodiment, the projector 1 includes a plurality of lamp covers 10 respectively in correspondence with the plurality of lamps 20. That is, the lamp covers 10 of the projector 1 include a first lamp cover 11 opened and closed when replacing the first lamp 21, a second lamp cover 12 opened and closed when replacing the second lamp 22, a third lamp cover 13 opened and closed when replacing the third lamp 23, and a fourth lamp cover 14 opened and closed when replacing the fourth lamp 24. A single lamp cover may be used in lieu of the plurality of lamp covers 10 to integrally accommodate the plurality of lamps 20.

When a lamp cover 10 is open, the lighting of the corresponding lamp 20, which becomes replaceable in the open state, is prohibited. Similarly, for example, the lighting of the first lamp 21 is prohibited when the first lamp cover 11 is open, and the lighting of the first lamp 21 is permitted when the first lamp cover 11 is closed.

The projector 1 includes a light combining unit 25, an image generation unit 26, and a projection lens 27 as elements of an optical system used to displaying an image. The light combining unit 25 combines the light emitted from the lamps 20. The image generation unit 26 generates an image using the light combined by the light combining unit 25. The projection lens 27 projects the light of the image generated by the image generation unit 26.

The lamps 20, which are discharge lamps such as ultrahigh pressure mercury lamps or metal halide lamps, can be simultaneously lit. The lamps 20 are lit to display an image. Each lamp 20 goes off, or becomes unlit, when its life comes to an end or when in a standby state. In this manner, the state of each lamp 20 changes between a lit state, which is a state in which the lamp 20 is lit, and an unlit state, which is a state in which the lamp 20 is unlit.

A combined lighting state of the lamps 20, that is, the combination of the lamps 20 that are lit can be changed. In other words, the number of lit lamps 20 can be changed. For example, the lamps 21 to 24 may all simultaneously be in the lit state. Alternatively, one, two, or three of the lamps 21 to 24 may be in the lit state, while the other lamps 20 are in the unlit state. In this manner, in the present embodiment, the combined lighting state of the lamps 20 includes a state in which the two or more of the lamps 20 are simultaneously lit as well as a state in which one of the lamps 20 is lit. The light emitted by the lit lamp 20 enters the light combining unit 25 and then enters the image generation unit 26.

The light combining unit 25 includes optical components that combine the light emitted from the lamps 20 to display an entire image. The light combined by the light combining unit 25 enters the image generation unit 26.

The image generation unit 26 includes electro-optic device such as a liquid crystal panel, which is a dot matrix light valve, and a digital micromirror device (DMD), which is formed by a lattice array of micromirrors. An image signal is input to the image generation unit 26. The liquid crystal panel and the DMD are driven based on the image signal. The light entering the image generation unit 26 from the lamp 20 through the light combining unit 25 is passed through the liquid crystal panel or reflected by the DMD to generate an image based on the image signal.

The projection lens 27 is a lens device including a group of lenses to project the light of the image generated by the image generation unit 26. Accordingly, the projection lens 27 projects light of an image out of the projector 1. This displays the image on a flat surface such as a screen or a wall.

To generate an image based on an image signal, which is an electric signal, the projector 1 includes an image signal input unit 31 and an image signal processing unit 32. The image signal input unit 31 receives an image signal from outside the projector 1. The image signal processing unit 32 performs signal processing on the image signal.

The image signal input unit 31 includes an image signal input terminal, which is connected to an image cable (not shown) and receives an image signal from an external device such as a personal computer (PC) or an image, reproduction device. The image signal processing unit 32 performs signal processing on the image signal input to the projector 1, such as scaling or a process for superimposing an OSD (setting screen) on an image. Then, the image signal processing unit 32 provides the processed image signal to the image generation unit 26. The image signal input unit 31 may be a wireless module that receives wireless transmissions of an image signal.

The projector 1, which is an electronic device, includes a plurality of lamp power supply units 40 (lighting devices), a control unit 51, a memory unit 52, an operation unit 53, and a timing unit 54. The lamp power supply units 40 are respectively arranged in correspondence with the lamps 20. The control unit 51, controls each unit of the projector 1. The memory unit 52 stores various types of information including programs or the like. The operation unit 53 is operated by the user. The timing unit 54 measures time.

Each lamp power supply unit 40 includes a power supply circuit (not shown) and a lamp power supply controller 40a. The power supply circuit supplies power to light the connected lamp 20. The lamp power supply controller 40a controls the power supply circuit. The lamp power supply unit 40 supplies power to the corresponding lamp 20 to light the lamp 20 based on a control signal from the control unit 51.

In the present embodiment, the projector 1 includes a plurality of lamp power supply units 40 in correspondence with the plurality of lamps 20. That is, the projector 1 includes a first lamp power supply unit 41 that lights the first lamp 21, a second lamp power supply unit 42 that lights the second lamp 22, a third lamp power supply unit 43 that lights the third lamp 23, and a fourth lamp power supply unit 44 that lights the fourth lamp 24.

The control unit 51 is formed by an integrated circuit that controls the signal processing of the image signal processing unit 32 and controls the lamps 20 with the lamp power supply units 40. Further, the control unit 51 is connected to the memory unit 52, which is formed by a memory, the operation unit 53, which is formed by an operation button, and the timing unit 54, which is formed by a timer counter.

The memory unit 52 stores a lighting mode after the replacement of a lamp 20. In the present embodiment, the memory unit 52 further stores a closed state determination reference time after opening and closing a lamp cover 10. FIG. 2, which shows one example of the information stored in the memory unit 52, is a table of stored items and the contents of the stored items. The table shows a four-lamp mode in which the four lamps 20 are simultaneously in the lit state to display an image. In this manner, in the present example, the memory unit 52 stores information related to the number of lamps 20 that are simultaneously lit as information related to the combined lighting state of the lamps 20. The information stored in the memory unit 52, that is, the lighting mode subsequent to the replacement of a lamp 20 and the closed state determination reference time may be changed with the operation unit 53.

The projector 1 includes an open cover detection unit 60, which serves as a light source replacement detection unit that detects the opening and closing of the lamp covers 10. The open cover detection unit 60 detects the open state and closed state of the lamp covers 10. The detection result of the open cover detection unit 60 is provided to the control unit 51 as an electric signal.

In the present embodiment, the projector 1 includes a plurality of open cover detection units 60 respectively in correspondence with the plurality of lamp covers 10. That is, the open cover detection units 60 of the projector 1 includes a first open cover detection unit 61 that detects the opening and closing of the first lamp cover 11, a second open cover detection unit 62 that detects the opening and closing of the second lamp cover 12, a third open cover detection unit 63 that detects the opening and closing of the third lamp cover 13, and a fourth open cover detection unit 64 that detects the opening and closing of the fourth lamp cover 14. There may be only one open cover detection unit when there is only one lamp cover.

In the present embodiment, the projector 1 includes the open cover detection units 60 that detect the replacement of the corresponding lamps 20, the memory unit 52, and the control unit 51 that changes the combined lighting state of the lamps 20 to display an image based on the information stored in the memory unit 52 when the replacement of a lamp 20 is detected. In this manner, in the present embodiment, the projector 1 has an automatic changing function that automatically changes the combined lighting state of the lamps 20 based on the information stored in the memory unit 52.

One example of the flow of operations performed by the projector 1 in relation with the automatic changing function, which automatically changes the combined lighting state of the lamps 20 when the replacement of a lamp 20 is detected, will be described with reference to FIG. 3.

When the life of one of the four lamps 20 ends, the control unit 51 of the projector 1 determines that the lamp 20 is unlit (step S11).

When the unlit state of one lamp 20 is detected in the four-lamp mode, the projector 1 switches the lighting mode to a three-lamp mode (step S12). In the three-lamp mode, three lamps 20 are simultaneously lit to display an image.

Based on the detection result of the open cover detection unit 60 corresponding to the unlit lamp 20, the control unit 51 determines whether or not the lamp cover 10 that opens and closes the area in which the unlit lamp 20, or replacement subject, is arranged is open (step S13). In other words, the open cover detection unit 60 outputs an open state detection signal when detecting that the lamp cover 10 corresponding to the lamp 20 that is to be replaced is open. The control unit 51 determines that the lamp cover 10 is open based on the open state detection signal.

When the open state of the lamp cover 10 is detected (step S13: YES), the control unit 51 determines whether or not the lamp cover 10 has been closed from the open state based on the detection result of the open cover detection unit 60 (step S14). For example, the open cover detection unit 60 outputs a closed state detection signal when a closed state of the lamp cover 10 is detected after detection of an open state. The control unit 51 determines that the lamp cover 10 is closed based on the closed state detection signal.

As described above, the replacement of a lamp 20 is determined when the open cover detection unit 60 detects the opening and closing of the corresponding lamp cover 10. For example, the first lamp 21 is determined as having been replaced when the first open cover detection unit 61 detects the opening and closing of the first lamp cover 11.

When determined in step S13 that the lamp cover 10 is not open, step S13 is repeated. When determined in step S14 that the lamp cover 10 is not closed, step S14 is repeated. In this manner, the three-lamp mode is maintained when the opening and closing of the lamp cover 10 is not detected by the open cover detection unit 60, that is, when the replacement of the unlit lamp 20 is not detected after entering the three-lamp mode.

When the open cover detection unit 60 detects the closed state of the lamp cover 10 (step S14: YES), the control unit 51 starts measuring time with the timing unit 54 (step S15). In other words, when the opening and closing of the lamp cover 10 is detected and the replacement of the unlit lamp 20 is detected, the timing unit 54 starts to measure time.

After starting the measurement of time in step S15, the control unit 51 determines whether or not the lamp cover 10 is open based on the detection result of the open cover detection unit 60 (step S16). When determined in step S16 that the lamp cover 10 is open, steps S14 to S16 are repeated.

When the lamp cover 10 remains closed after the measurement of time is started in step S15, that is, when an open state of the lamp cover 10 is not detected in step S16, the control unit 51 determines whether or not the closed state determination reference time stored in the memory unit 52 has elapsed from when the measurement of time started (step S17). The control unit 51 and timing unit 54 form an open/close determination unit that determines the opening and closing of the lamp cover 10 detected by the open cover detection unit 60. In step S17, the control unit 51 and timing unit 54, which form the open/close determination unit, measure the elapsed time from when the lamp cover 10 is closed and determines that the lamp cover 10 is closed based on the elapsed time.

When determined in step S17 that the closed state determination reference time has elapsed from when the lamp cover 10 is closed, the projector 1 switches the lighting mode to the four-lamp mode (step S18). In other words, when determined by the control unit 51 and the timing unit 54 that the lamp cover 10 has been closed during the reference time, the control unit 51 starts to light the replaced lamp 20 in step S18.

When determined in step S17 that the closed state determination reference time has not elapsed from when the lamp cover 10 is closed, steps S16 and S17 are repeated. In the present embodiment, steps S14 to S16 are repeated when determined in step S16 that the lamp cover 10 is open. Thus, when the lamp cover 10 reopens before the closed state determination reference time elapses from when the lamp cover 10 is closed, step S15 is repeated so that the timing unit 54 re-measures the time. This ensures that there is time before shifting to the four-lamp mode when the lamp cover 10 opens before the closed state determination reference time elapses from when the lamp cover 10 is closed.

The first embodiment has the advantages described below.

(1) The projector 1 includes the open cover detection units 60 that detect replacement of the lamps 20, the memory unit 52 that stores information related to the combined lighting state of the lamps 20 (in the present example, the number of the lit lamps 20), and the control unit 51 that changes the combined lighting state of the lamps 20 to display an image based on the information stored in the memory unit 52 when replacement of a lamp 20 is detected. Accordingly, when the replacement of a lamp 20 is detected, the combined lighting state of the lamps 20 is automatically changed to display an image based on the information stored in the memory unit 52. In this manner, the information related to the desired combined lighting state subsequent to the replacement of a lamp 20 is stored in advance in the memory unit 52. This eliminates the need to show an OSD (setting screen), which is a projected image used by the user to select the combined lighting state, after the replacement of a lamp 20. Thus, the combined lighting state of the lamps 20 is easily changed.

(2) The projector 1 includes the lamp covers 10, which open and close the space in which the lamps 20 are arranged, and the open cover detection units 60, which serve as the light source replacement detection units that detect the opening and closing of the corresponding lamp covers 10. Accordingly, the replacement of a lamp 20 is detected when an open cover detection unit 60 detects the opening and closing of the corresponding lamp cover 10. Thus, when opening and closing a lamp cover 10 to replace a lamp 20, the replacement of the lamp 20 is inevitably detected.

(3) The projector 1 includes the control unit 51 and the timing unit 54, which form the open/close determination unit that determines the opening and closing of a lamp cover 10 detected by the corresponding open cover detection unit 60. When the open/close determination unit determines that the lamp cover 10 has been continued closed over the reference time, the control unit 51 starts to light the lamps 20. The lighting of the replaced lamp 20 is thus not started immediately after the detection that the lamp cover 10 is closed is made. Therefore, the time for close operating the lamp cover 10, that is, the time for the replacement task of the lamp 20 is appropriately managed.

(4) The elapsed time from when a lamp cover 10 is closed is measured, and the closing of the lamp cover 10 is confirmed based on the elapsed time. Accordingly, the open/close determination unit may be formed using the timing unit 54 that measures time such as a timer counter.

Second Embodiment

A second embodiment will now be described. Parts that are identical to the first embodiment will not be described in detail.

A projector 1 according to a second embodiment includes a manual changing function that changes the combined lighting state of the lamps 20 when the operation unit 53 is operated in lieu of the automatic changing function that automatically changes the combined lighting state of the lamps 20 when the replacement of a lamp 20 is detected.

Figure 4:
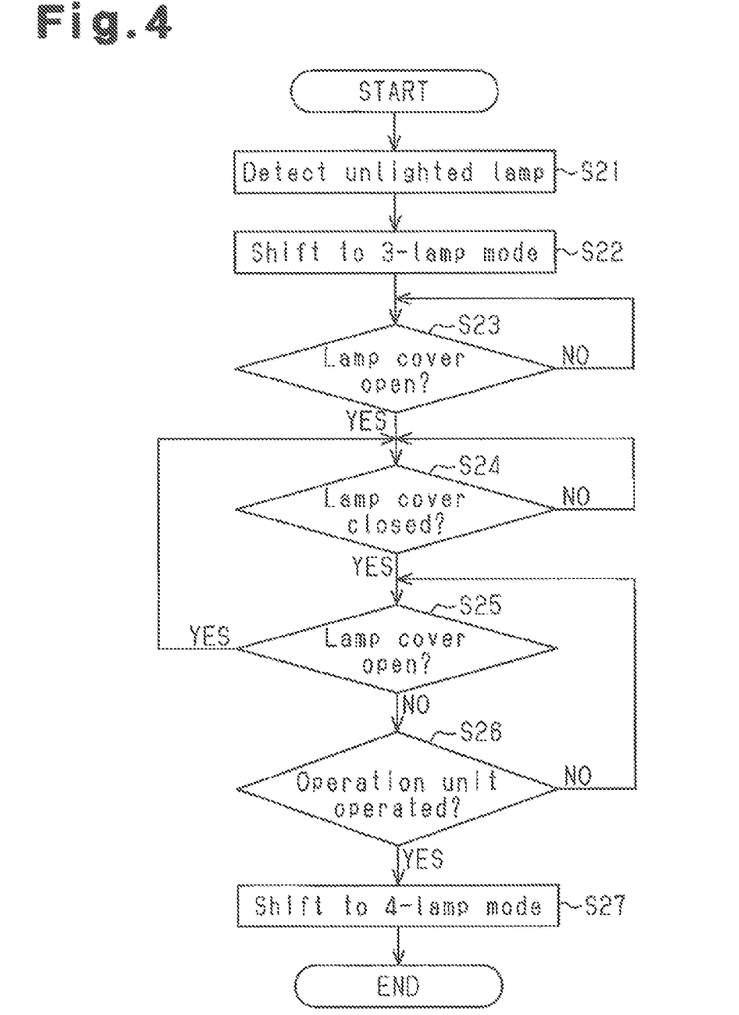
FIG. 4 is a flowchart showing the flow of operations in a second embodiment of a video projector.

One example of the flow of operations of the projector 1 related to the manual changing function that changing the combined lighting state of the lamps 20 at the user's desired timing when replacement of a lamp 20 will be described with reference to FIG. 4.

In the same manner as steps S11 and S12, when the life of one of the four lamps 20 ends, the control unit 51 determines that the lamp 20 is unlit (step S21). Then, the lighting mode of the projector 1 is switched to the three-lamp mode (step S22).

In the same manner as step S13, the control unit 51 determines whether or not the lamp cover 10, which opens and closes the area in which the unlit lamp 20, or replacement subject, is arranged, is open (step S23).

When determined that the lamp cover 10 is open (step S23: YES), the control unit 51 determines whether or not the lamp cover 10 has been closed in the same manner as in step S14 (step S24).

In the present embodiment, when the open cover detection unit 60 by detects the opening and closing of the lamp cover 10 corresponding to the lamp 20 that is to be replaced, the replacement of the lamp 20 is determined. When determined in step S23 that the lamp cover 10 is not open, step S23 is repeated. When determined in step S24 that the lamp cover 10 is not closed, step S24 is repeated. In this manner, in the present embodiment, when the open cover detection unit 60 does not detect the opening and closing of the lamp cover 10, that is, when the replacement of the unlit lamp 20 is not detected after entering the three-lamp mode, the three-lamp mode is maintained.

When the closed state of the lamp cover 10 is detected by the open cover detection unit 60 in step S24, the control unit 51 further determines whether or not the lamp cover 10 is open based on the detection result of the open cover detection unit 60 (step S25). When determined in step S25 that the lamp cover 10 is open, steps S24 and S25 are repeated.

When the lamp cover 10 remains closed after replacement of the lamp 20, that is, when determined in step S25 that the lamp cover 10 has not been opened, the control unit 51 determines whether or not the operation unit 53 is operated (step S26). When the operation unit 53 is operated, the operation content of the operation unit 53 is provided to the control unit 51 as an electric signal. Accordingly, the control unit 51 determines whether or not the operation unit 53 is operated based on the electric signal from the operation unit 53. In this case, the operation content of the operation unit 53 may be any operation as long as it is not an operation for displaying an OSD. For example, the operation may be continuous pushing of any operation key for a predetermined time or the pushing of a dedicated operation key.

When determined in step S26 that the operation unit 53 has been operated (i.e., when the operation unit 53 is operated by user), the control unit 51 switches the lighting mode of the projector 1 to the four-lamp mode (step S27). That is, in the second embodiment, the control unit 51 changes the combined lighting state of the lamps 20 to display an image when the replacement of a lamp 20 is determined and the operation unit 53 is operated. Thus, the closed state determination reference time is not relied upon like in the first embodiment when changing the combined lighting state of the lamps 20 after the replacement of a lamp 20. In this case, the control unit 51 starts to light the replaced lamp 20 based on the information stored in the memory unit 52.

When determined in step S26 that the operation unit 53 has not been operated, steps S25 and S26 are repeated. In the second embodiment steps S24 and S25 are repeated when determined in step S25 that the lamp cover 10 is open. Accordingly, after the lamp cover 10 is closed, when the lamp cover 10 is reopened before the operation unit 53 is operated, the projector 1 does not shift to the four-lamp mode.

The second embodiment has the following advantage.

(5) The projector 1 includes the open cover detection unit 60, the memory unit 52, the operation unit 53 operated by the user, and the control unit 51 that changes the combined lighting state of the lamps 20 to display an image based on the information stored in the memory unit 52 when replacement of the lamp 20 is detected and the operation unit 53 is operated. Accordingly, the combined lighting state of the lamps 20 is automatically changed to display an image based on the information stored in the memory unit 52 when replacement of the lamp 20 is detected and the operation unit 53 is operated. In this manner, information related to the desired combined lighting state after replacement of a lamp 20 is stored in advance in the memory unit 52. This eliminates the need to show an OSD (setting screen), which is a projected image used by the user to select the combined lighting state, after the replacement of a lamp 20. Thus, the combined lighting state of the lamps 20 is easily changed. Further, the combined lighting state of the lamps 20 is automatically changed when replacement of a lamp 20 is determined and the operation unit 53 is operated. Thus, the combined lighting state of the lamps 20 is changed at the user's desired timing.

Third Embodiment

A third embodiment will now be described. Parts that are identical to the first embodiment will not be described in detail.

A third embodiment of a projector 1 includes an automatic changing function, which changes the combined lighting state of the lamps 20 when the replacement of a lamp 20 is detected, and a manual changing function, which changes the combined lighting state of the lamps 20 when the operation unit 53 is operated.

In the third embodiment, the projector 1 includes the automatic changing function of the first embodiment and the manual changing function of the second embodiment. Further, in the third embodiment, the manual changing function of the projector 1 includes a first manual changing function and a second manual changing function. The first manual changing function shows an OSD used by the user to select the combined lighting state and manually change the combined lighting state of the lamps 20. The second manual changing function is identical to the manual changing function of the second embodiment.

Figure 5:
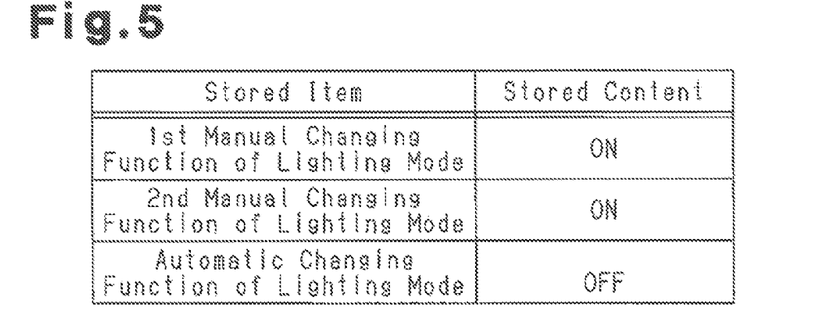
FIG. 5 is a table showing an example of items stored in a memory unit and the contents of the items in a third embodiment of a video projector.

In the third embodiment, a setting that activates the automatic changing function and the manual changing function can be changed. The information related to whether or not to activate the automatic changing function and the manual changing function is stored in the memory unit 52. The setting information for activating and inactivating each function may be changed with, for example, the operation unit 53. FIG. 5, which shows one example of the information stored in the memory unit 52, is a table of stored items and the contents of the stored items. In FIG. 5, the first manual changing function and the second manual changing function are set to be active, and the automatic changing function is set to be inactive.

The third embodiment has the advantages described below in addition to advantages (1) to (4) and (5) described above.

(6) In addition to the automatic changing function that changes the combined lighting state of the lamps 20 when a lamp 20 is replaced, the projector 1 includes the manual changing function that changes the combined lighting state of the lamps 20 when the operation unit 53 is operated. Thus, the combined lighting state of the lamps 20 is not only automatically changed but may also be manually changed.

(7) The setting on whether or not to activate the automatic changing function is changeable. When the automatic changing function is inactive, the combined lighting state of the lamps 20 is not automatically changed upon detection of the replacement of a lamp 20. When the automatic changing function is active, the combined lighting state of the lamps 20 is automatically changed upon detection of the replacement of a lamp 20.

(8) The setting is changeable that activates the function for changing the combined lighting state of the lamps 20 (i.e., second manual changing function and automatic changing function) based on the information stored in the memory unit 52. Thus, by inactivating this function, the changing of the combined lighting state based on the information stored in the memory unit 52 can be inhibited.

Fourth Embodiment

A fourth embodiment will now be described. Parts that are identical to the above embodiments will not be described in detail.

Figure 6:
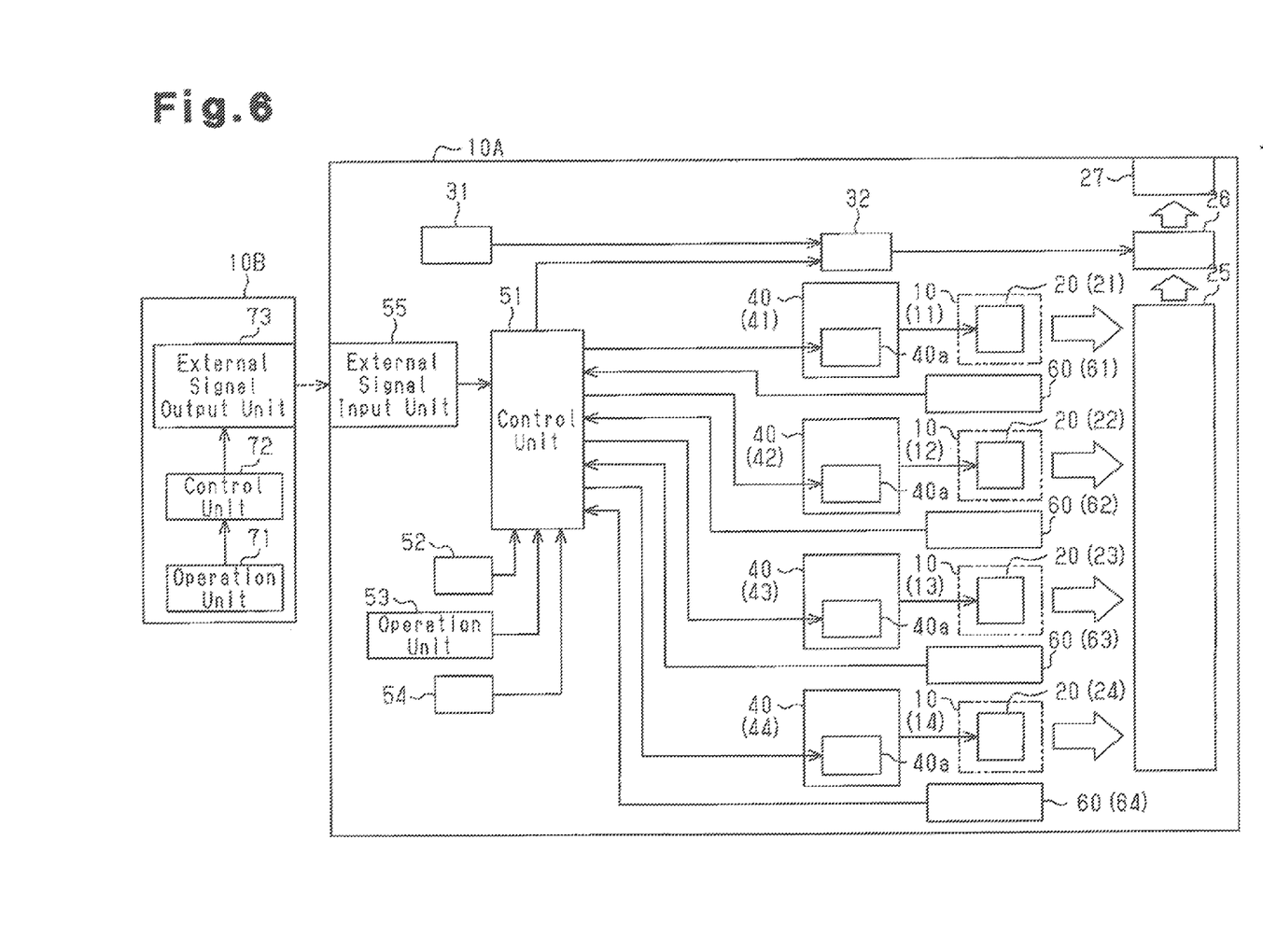
FIG. 6 is a schematic diagram showing a fourth embodiment of a video projector.

As shown in FIG. 6, a fourth embodiment of the projector 1 includes a remote controller 10B serving as a remote operation device dedicated to the control unit 51. Signals are transmitted from the remote controller 10B, which is discrete from the housing 10A, to the housing 10A.

The projector 1 includes an external signal input unit 55 that receives signals from the remote controller 10B, which is an external device. The signal output from the remote controller 10B is input as an electric signal to the control unit 51 through the external signal input unit 55. The external signal input unit 55 is a component capable of communicating with an external signal output unit 73 of the remote controller 10B and is formed by, for example, an infrared light receiving module.

The remote controller 10B includes an operation unit 71 operated by a user, a control unit 72, and the external signal output unit 73 that outputs signals to the external signal input unit 55. The control unit 72, which is formed by a microcomputer or the like, controls the external signal output unit 73 to output a signal corresponding to the operation content of the operation unit 71. The external signal output unit 73 is a component capable of communicating with the external signal input unit 55, which is arranged in the housing 10A, and is formed by, for example, an infrared light emitting module.

Figure 7A:
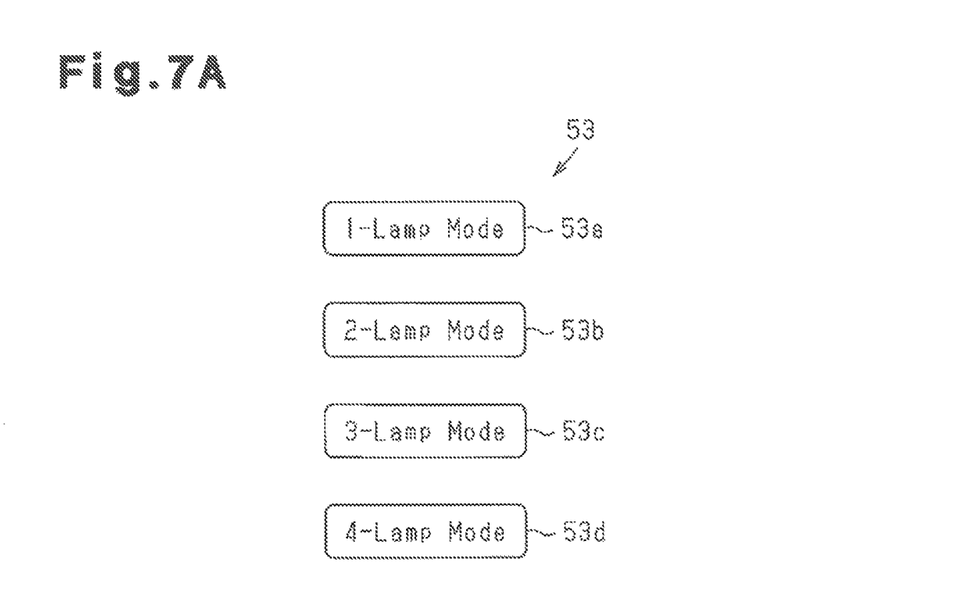
FIG. 7 is a schematic diagram showing an operation unit in the video projector of FIG. 6.
Figure 7B:
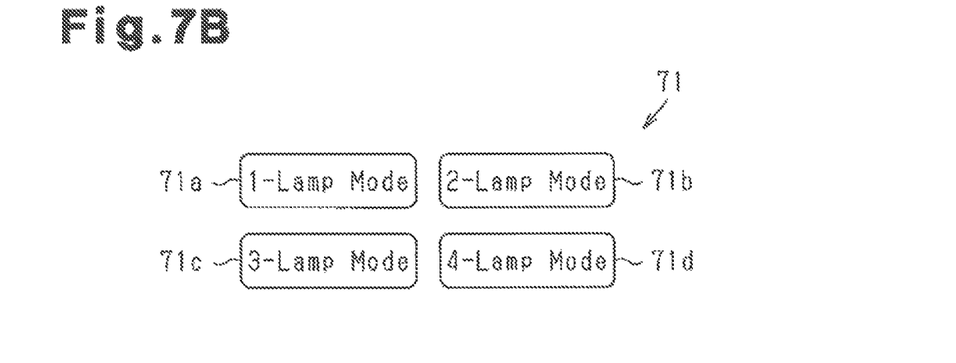

As shown in FIGS. 7A and 7B, in the fourth embodiment, the operation unit 53 includes operation keys 53a to 53d respectively, corresponding to a predetermined combined lighting state of the lamps 20. Further, the operation unit 71 includes operation keys 71a to 71d respectively corresponding to a predetermined combined lighting state of the lamps 20. FIG. 7A is a schematic view showing one example of the operation unit 53, and FIG. 7B is a schematic view showing one example of the operation unit 71.

The operation unit 53 shown in FIG. 7A includes a first operation key 53a corresponding to the one-lamp mode, a second operation key 53b corresponding to a two-lamp mode, a third operation key 53c corresponding to a three-lamp mode, and a fourth operation key 53d, corresponding to a four-lamp mode.

As shown in FIG. 7B, the operation unit 71 arranged in the remote controller 10B also includes a first operation key 71a corresponding to the one-lamp mode, a second operation key 71b corresponding to the two-lamp mode, a third operation key 71c corresponding to a three-lamp mode, and a fourth operation key 71d corresponding to a four-lamp mode.

In the fourth embodiment, when one of the operation keys 53a to 53d and 71a to 71d is pushed, the control unit 5l changes the lighting state of the lamps 20 to a predetermined combination that is in accordance with the pushed operation key without displacing an OSD. Thus, the lighting mode of the projector 1 can be changed by just pushing the operation keys 53a to 53d and 71a to 71d.

When the first operation key 53a or 71a is pushed, the control unit 51 lights one of the lamps 21 to 24 and turns off the other lamps 20. In this manner, when the first operation key 53a or 71a is pushed, the projector 1 shifts to the one-lighting mode in which only one lamp 20 is lit to display an image.

When the second operation key 53b or 71b is pushed, the control unit 51 lights two of the lamps 21 to 24 and turns off the other lamps 20. Thus, when the second operation key 53b or 71b is pushed, the projector 1 shifts to the two-lighting mode in which two lamps 20 are simultaneously lit to display an image.

When the third operation key 53c or 71c is pushed, the control unit 51 lights three of the lamps 21 to 24 and turns off the remaining lamp 20. Thus, when the third operation key 53c or 71c is pushed, the projector 1 shifts to the above-described three-lamp mode.

When the fourth operation key 53d or 71d is pushed, the control unit 51 lights all of the lamps 21 to 24. Thus, when the fourth operation key 53d or 71d is pushed, the projector 1 shifts to the above-described four-lamp mode.

As described above, in the fourth embodiment, the projector 1 includes a manual changing function for changing the combined lighting state of the lamps 20 when the operation unit 53 or 71 is operated without displaying an OSD.

The fourth embodiment has the advantages described below.

(9) The operation unit 53 includes the operation keys 53a to 53d corresponding to the predetermined combined lighting state of the lamps 20. When one of the operation keys 53a to 53d is pushed, the control unit 51 changes the lighting state of the lamp 20 to the predetermined combination. Thus, the predetermined combined lighting state of the lamps 20 is selected by simply pushing one of the operation keys 53a to 53d. This eliminates the need to show an OSD (setting screen), which is a projected image used by the user to select the combined lighting state, after the replacement of a lamp 20. Thus, the combined lighting state of the lamps 20 is easily changed.

Further, the operation unit 71 also includes the operation keys 71a to 71d corresponding to the predetermined combined lighting state of the lamps 20. When one of the operation keys 71a to 71d is pushed, the control unit 51 changes the lighting state of the lamp 20 to the predetermined combination. Thus, the use of the remote controller 10B also eliminates the need to show an OSD (setting screen), which is a projected image used by the user to select the combined lighting state, after the replacement of a lamp 20, and the combined lighting state of the lamps 20 is easily changed.

(10) The projector 1 includes the remote controller 10B, which is a remote operation device dedicated to the control unit 51. Further, the remote controller 10B includes the operation unit 71. Thus, the combined lighting state of the lamps 20 may be changed through a remote operation. Further, the projector 1 is remotely operated using the remote controller 10B dedicated to the control unit 51. This changes the combined lighting state of the lamps 20 more easily than when the projector 1 is remotely operated using a general-purpose remote operation device.

Fifth Embodiment

A fifth embodiment will now be described. Parts that are identical to the fourth embodiment will not be described in detail.

Figure 8:
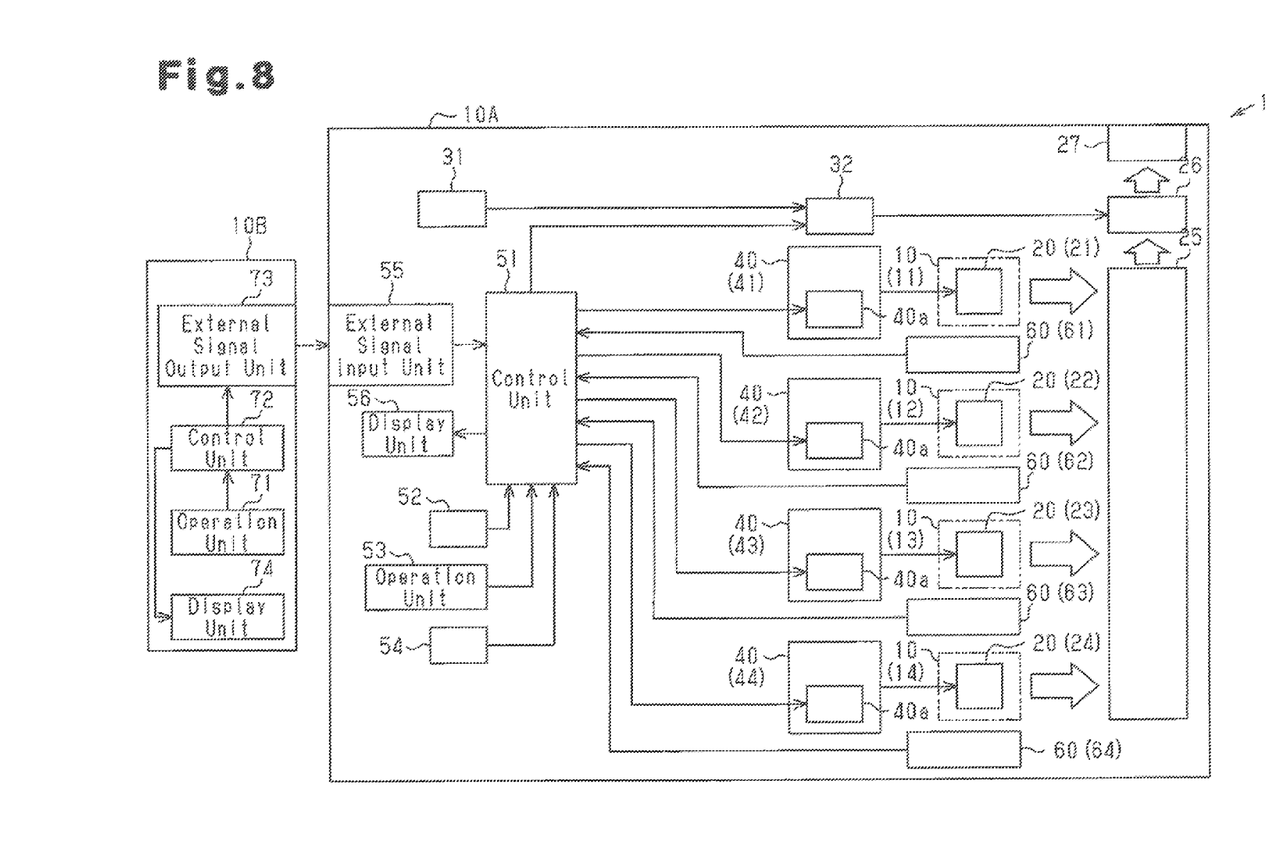
FIG. 8 is a schematic diagram showing a fifth embodiment of a video projector.

As shown in FIG. 8, a fifth embodiment of a projector 1 includes display units 56 and 74 that display images in regions that differ from the region in which an image is projected and displayed. The display unit 56 is arranged on the housing 10A, and the display unit 74 is arranged on the remote controller 10B.

The display units 56 and 74 are formed by a compact electro-optic display such as an organic EL display or a liquid crystal display. The display unit 56 arranged on the housing 10A is controlled by the control unit 51, and the display unit 74 arranged on the remote controller 10B is controlled by the control unit 72.

In the fifth embodiment, instead of displaying an OSD for selecting the combined lighting state as an image on a screen or wall, an image for selecting the combined lighting state is displayed on the display units 56 and 74.

The projector 1 displays an image used by the user to select the combined lighting state of the lamps 20 on the display units 56 and 75 based on the operation of the operation units 53 and 71. The image is not an OSD. As described above, in the fifth embodiment, the projector 1 has a manual changing function that presents the user with an image for selecting the combined lighting state of the lamps 20 on the display units 56 and 74. The user changes the combined lighting state of the lamps 20 by operating the operation units 53 and 71.

The fifth embodiment has the following advantage.

(11) The projector 1 includes the display unit 56, which displays an image in a region that differs from the region in which the video is displayed. The display unit 56 displays an image for selecting the combined lighting state of the lamps 20 based on the operation of the operation unit 53. Thus, the user refers to the image displayed on the display unit 56 to select the combined lighting state of the lamps 20. This eliminates the need to show an OSD (setting screen), which is a projected image used by the user to select the combined lighting state, after the replacement of a lamp 20. Thus, the combined lighting state of the lamps 20 is easily changed.

An image used to select the combined lighting state of the lamps 20 is also displayed on the display unit 74, which is arranged in the remote controller 10B, based on the operation of the operation unit 71. Thus, the use of the remote controller 10B obtains the above-described advantages (10) and (11).

It should be apparent to those skilled in the art that the present invention may be embodied in many other specific forms without departing from the spirit or scope of the invention. Particularly, it should be understood that the present invention may be embodied in the following forms.

In the first to fifth embodiments, the memory unit 52 stores the information related to the number of lamps 20 that are lit. That is, the memory unit 52 stores the information related to the combined lighting state of the lamps 20. Instead, or additionally, the memory unit 52 may store information related to luminance at which the lamps 20 emit light, that is, the light intensity. In other words, the information related to the combined lighting state of the lamps 20 stored in the memory unit 52 is not limited to the combination of lit and unlit lamps 20 and may include information such as light intensity of the lamps 20.

In the first embodiment, the open/close determination unit is configured to determine that the lamp cover 10 is closed based on the elapsed time from when the lamp cover 10 is closed but not limited in such a configuration. The open/close determination unit may be configured to omit the processes of steps S15, S16, and S17. Further, the timing unit 54 may be eliminated from the open/close determination unit. In this case, steps S15 and S17 are eliminated. Further, steps S16 and S25 may be eliminated.

In the first to third embodiments, the light source replacement detection unit is the open cover detection unit 60. However, any type of light source replacement detection unit may be used as long as replacement of the light source can be detected. For example, the light source replacement detection unit may detect the removal and attachment of the light source.

In the third embodiment, the video projector has the automatic changing function described in the first embodiment and the manual changing function described in the second embodiment. However, the video projector may further include the manual changing functions described in, for example, the fourth embodiment or the fifth embodiment. To flexibly meet a user's demand, the projector 1 preferably includes two or more of the automatic changing function described in the first embodiment, the manual changing function described in the second embodiment, the manual changing function described in the fourth embodiment, and the manual changing function described in the fifth embodiment.

The setting on whether or not to activate the manual changing function described in the fourth embodiment and the manual changing function described in the fifth embodiment may be changeable. The setting on whether or not to activate the automatic changing function or the manual changing function may be fixed.

In the fourth embodiment, the lighting state of the lamps 20 is changed to the predetermined combination when one of the operation keys 53a to 53d and 71a to 71d is pushed. Instead, the lighting state of the lamps 20 may be changed to a predetermined combination when a plurality of operation keys are simultaneously pushed.

In the fourth embodiment or the fifth embodiment, the remote controller 10B may be eliminated from the projector 1. In the first to third embodiments, the projector 1 may include the remote controller 10B. In the second or third embodiment, when the projector 1 includes the remote controller 10B, the combined lighting state of the lamps 20 may be changed when replacement of a lamp 20 is detected and the operation unit 71 is operated.

The light source that emits light does not have to be the lamps 20. Further, the projector 1 does not have to include four light sources. In other words, the present invention may be applied to any video projector including a plurality of light sources.

The present examples and embodiments are to be considered as illustrative and not restrictive, and the invention is not to be limited to the details given herein, but may be modified within the scope and equivalence of the appended claims.

The invention claimed is:

1. A video projector comprising:
a plurality of light sources, wherein the video projector is configured to project and display an image using light emitted from at least one of the light sources so that each light source is replaceable while other light sources are lit, wherein replacing any one of the light sources includes removing the light source from the video projector while other light sources are lit and inserting a new light source in place of the removed light source;
a light source replacement detection unit that detects replacement of one or more of the light sources;
a memory unit that stores information related to a combined lighting state of the light sources; and
a control unit that changes the combined lighting state of the light sources when the replacement of at least one light source is detected without displaying, on the projected image, a setting screen used to change the combined lighting state.

2. The video projector according to claim 1, wherein the control unit changes the combined lighting state of the light sources based on the information stored in the memory unit when the replacement of the light source is detected.

3. The video projector according to claim 1, further comprising a light source cover that opens and closes an area in which one or more of the light sources are arranged,
wherein the light source replacement detection unit includes an open cover detection unit that detects opening and closing of the light source cover, and
the replacement of the light source is detected when the open cover detection unit detects the opening and closing of the light source cover.

4. The video projector according to claim 3, further comprising an open/close determination unit that determines the opening and closing of the light source cover based on a detection result of the open cover detection unit, wherein the control unit starts to light a newly replaced light source when the open/close determination unit determines that the light source cover is closed after the replacement of the light source.

5. The video projector according to claim 4, wherein the open/close determination unit measures an elapsed time from when the light source cover is closed and determines that the light source cover is closed based on the elapsed time.

6. The video projector according to claim 1, further comprising an operation unit operated by a user, wherein the video projector includes a manual changing function for changing the combined lighting state of the light sources when the operation unit is operated in addition to an automatic changing function for changing the combined lighting state of the light sources when the replacement of the light source is detected.

7. The video projector according to claim 6, wherein setting information for activating and inactivating the automatic changing function is changeable.

8. The video projector according to claim 1, further comprising an operation unit operated by a user, wherein the control unit changes the combined lighting state of the light sources based on the information stored in the memory unit when the replacement of the light source is detected and the operation unit is operated.

9. The video projector according to claim 1, wherein setting information for activating and inactivating a function that changes the combined lighting state of the light sources based on the information stored in the memory unit is changeable.

10. The video projector according to claim 1, further comprising an operation unit operated by a user and including an operation key that designates the combined lighting state of the light sources, wherein the control unit changes the combined lighting state of the light sources to a predetermined combined lighting state when the operation key is pushed.

11. The video projector according to claim 1, further comprising:
an operation unit operated by a user; and
a display unit that displays an image in a region that differs from a region in which the projected image is displayed;
wherein the display unit displays an image used to select the combined lighting state of the light sources based on the operation of the operation unit.

12. The video projector according to claim 10, further comprising a remote operation device dedicated to the control unit, wherein the operation unit is arranged on the remote operation device.

13. The video projector according to claim 11, further comprising a remote operation device dedicated to the control unit, wherein the operation unit is arranged on the remote operation device.

14. A video projector comprising:
a plurality of light sources, wherein the video projector is configured to project and display an image using light emitted from at least one of the light sources so that each light source is replaceable while other light sources are lit;
a light source replacement detection unit that detects replacement of one or more of the light sources;
a memory unit that stores information related to a combined lighting state of the light sources;
a control unit that changes the combined lighting state of the light sources when the replacement of at least one light source is detected without displaying, on the projected image, a setting screen used to change the combined lighting state; and
a light source cover that opens and closes an area in which one or more of the light sources are arranged,
wherein the light source replacement detection unit includes an open cover detection unit that detects opening and closing of the light source cover, and
the replacement of the light source is detected when the open cover detection unit detects the opening and closing of the light source cover.

15. A video projector comprising:
a plurality of light sources, wherein the video projector is configured to project and display an image using light emitted from at least one of the light sources so that each light source is replaceable while other light sources are lit;
a light source replacement detection unit that detects replacement of one or more of the light sources;
a memory unit that stores information related to a combined lighting state of the light sources;
a control unit that changes the combined lighting state of the light sources when the replacement of at least one light source is detected without displaying, on the projected image, a setting screen used to change the combined lighting state; and an operation unit operated by a user, wherein the video projector includes a manual changing function for changing the combined lighting state of the light sources when the operation unit is operated in addition to an automatic changing function for changing the combined lighting state of the light sources when the replacement of the light source is detected.

\* \* \* \* \*